Patented Jan. 11, 1944

2,339,060

UNITED STATES PATENT OFFICE 2,339,060

DIAZINE DERIVATIVES

Gaetano F. D'Alelio and James W. Underwood, Pittsfield, Mass., assignors to General Electric Company, a corporation of New York No Drawing. Application August 26, 1942, Serial No. 456,263

18 Claims. (Cl. 260—251)

This invention relates to the production of new chemical compounds and more particularly to diazine derivatives. The invention especially is concerned with the production of new and useful poly-(diazinyl hydrazino) derivatives of polycarboxylic acids.

The chemical compounds of this invention may be represented by the following general formula:

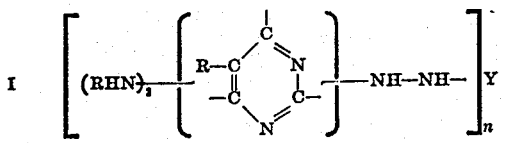

I where R represents a member of the class consisting of hydrogen and monovalent hydrocarbon and substituted hydrocarbon radicals, more particularly halo-hydrocarbon radicals, Y represents a polyacyl radical of a polycarboxylic acid, more particularly an aliphatic or an aromatic polycarboxylic acid, and $n$ is an integer having a value equal to the valency of the acyl radical of Y. In the compounds represented by the above formula and by similar formulas hereafter given, one nitrogen atom of the grouping —NH—NH— is linked to a carbon atom of the diazine nucleus and the other nitrogen atom is linked to a carbon atom of a carbonyl grouping of the polyacyl radical represented by Y.

Illustrative examples of radicals that R in the above formula may represent are: aliphatic (e. g., methyl, ethyl, propyl, isopropyl, butyl, secondary butyl, isobutyl, butenyl, amyl, isoamyl, hexyl, octyl, allyl, methallyl, ethallyl, crotyl, etc.), including cycloaliphatic (e. g., cyclopentyl, cyclopentenyl, cyclohexyl, cyclohexenyl, cycloheptyl, etc.); aryl (e. g., phenyl, diphenyl or xenyl, naphthyl, anthracyl, etc.); aliphatic-substituted aryl (e. g., tolyl, xylyl, ethylphenyl, propylphenyl, isopropylphenyl, allylphenyl, 2-butenylphenyl, tertiary-butylphenyl, etc.); aryl-substituted aliphatic (e. g., benzyl, phenylethyl, cinnamyl, phenylpropyl, etc.) and their homologues, as well as those groups with one or more of their hydrogen atoms substituted by, for example, a halogen, more particularly chlorine, bromine, fluorine or iodine. Specific examples of halogeno-substituted hydrocarbon radicals that R in the above formula may represent are: chloromethyl, chloroethyl, chlorophenyl, dichlorophenyl, ethyl chlorophenyl, chlorocyclohexyl, phenyl chloroethyl, bromoethyl, bromopropyl, iodophenyl, fluorophenyl, bromotolyl, etc. Preferably R in Formula I is hydrogen, in which case the compounds may be represented by the general formula:

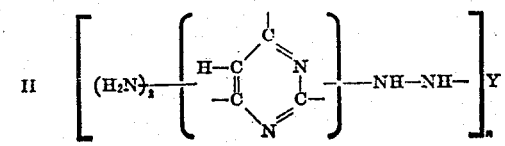

II where $n$ and Y have the same meaninngs as given above with reference to Formula I.

Illustrative examples of polyacyl radicals that Y in Formulas I and II may represent are: aliphatic polyacyl (e. g., oxalyl, malonyl, succinyl, glutaryl, adipyl, tricarballylyl, etc.), including unsaturated aliphatic polyacyl, e. g., maleyl, fumaryl, glutaconyl, itaconyl, citraconyl, mesaconyl, glutinyl, aconityl, muconyl, etc., and aromatic polyacyl, e. g., phthalyl, naphthalyl, trimesyl, chlorophthalyl, bromophthalyl, isophthalyl, terephthalyl, etc. Preferably Y is a succinyl or a phthalyl radical.

The new compounds of this invention may be used, for example, as pharmaceuticals, plasticizers and as intermediates in the preparation of derivatives thereof, e. g., methylol, methylene, etc., derivatives of the individual compound embraced by Formula I. These new compounds are especially valuable in the preparation of synthetic resinous compositions. Thus, they may be condensed with, for instance, aldehydes, including polymeric aldehydes, hydroxyaldehydes and aldehyde-addition products, to yield condensation products of particular utility in the plastics and coating arts. Such condensation products are more fully described and are specifically claimed in our copending application Serial No. 461,768, filed October 12, 1942, and assigned to the same assignee as the present invention.

Various methods can be employed to produce the chemical compounds of this invention. One suitable method comprises effecting reaction, in the presence of a hydrohalide acceptor, between a diazine derivative corresponding to the general formula

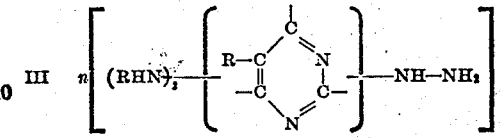

III and an acyl halide corresponding to the general formula

IV              YX$_n$ where X represents a halogen atom, and $n$, Y and R have the same meanings as given above with reference to Formula I, each halogen atom represented by X being linked directly to a carbon atom of a carbonyl group of the polyacyl radical represented by Y.

Illustrative examples of hydrazino-substituted diazines that may be employed, depending upon the particular end-product sought, are:

2-hydrazino 4,6-diamino pyrimidine
4-hydrazino 2,6-diamino pyrimidine (6-hydrazino 2,4-diamino pyrimidine)
2-hydrazino 4,6-di-(methylamino) pyrimidine
4-hydrazino 2,6-di-(methylamino) pyrimidine
2-hydrazino 4,6-di-(methylamino) pyrimidine 4-hydrazino 2,6-di-(propylamino) pyrimidine
2-hydrazino 4,6-di-(propenylamino) pyrimidine
2-hydrazino 4,6-di-(isobutylamino) pyrimidine
2-hydrazino 4,6-dianilino pyrimidine
4-hydrazino 2,6-dianilino pyrimidine
2-hydrazino 4,6-ditoluido pyrimidine
4-hydrazino 2,6-ditoluido pyrimidine
4-hydrazino 2,6-dixylidino pyrimidine
4-hydrazino 2,6-di-(benzylamino) pyrimidine
2-hydrazino 4,6-di-(ethylanilino) pyrimidine
2-hydrazino 4,6-di-(cyclopentylamino) pyrimidine
2-hydrazino 4,6-diamino 5-methyl pyrimidine
2-hydrazino 4,6-diamino 5-phenyl pyrimidine
2-hydrazino 4,6-dianilino 5-methyl pyrimidine
2-hydrazino 4,6-dianilino 5-phenyl pyrimidine
2-hydrazino 4-methylamino 6-amino pyrimidine
2-hydrazino 4-fluoroanilino 6-amino pyrimidine
2-hydrazino 4-methylamino 6-anilino pyrimidine
4-hydrazino 2,6-di-(methylamino) 5-tolyl pyrimidine
2-hydrazino 4-cyclohexylamino 5-benzyl 6-xylidino pyrimidine
2-hydrazino 4,6-di-(chloroethylamino) pyrimidine
2-hydrazino 4,6-di-(chloroanilino) pyrimidine
4-hydrazino 2,6-di-(bromoanilino) pyrimidine
2-hydrazino 4,6-di-(iodotoluido) pyrimidine
2-hydrazino 4,6-di-(bromopropylamino) pyrimidine
2-hydrazino 4,6-di-(methylamino) 5-chlorophenyl pyrimidine
4-hydrazino 2,6-di-(allylamino) 5-allyl pyrimidine
2-hydrazino 4,6-di-(octylamino) 5-cyclohexyl pyrimidine
4-hydrazino 2,6-di-(cyclohexenylamino) pyrimidine
2-hydrazino 4,6-di-(phenethylamino) pyrimidine
4-hydrazino 2,6-di-(cinnamylamino) pyrimidine
2-hydrazino 4,6-di-(butenylamino) 5-xenyl pyrimidine Illustrative examples of acyl halides embraced by Formula IV that may be used, depending upon the desired end-product, are:

Oxalyl chloride (ethandioyl chloride)
Malonyl chloride
Succinyl chloride
Succinyl bromide
Adipyl chloride
Glutaryl chloride
Pimelyl chloride
Suberyl chloride
Sebacyl chloride
Tricarballylyl chloride
Maleyl chloride
Fumaryl chloride
Glutaconyl chloride
Itaconyl chloride
Citraconyl chloride
Mesaconyl chloride
Phthalyl chloride
Phthalyl bromide
Trimesyl chloride
Naphthalyl chloride
Chloronaphthalyl chloride
Bromonaphthalyl chloride
Chlorophthalyl chloride
Bromophthalyl bromide
Succinyl iodide
Malonyl bromide Various hydrohalide acceptors may be employed but we prefer to use a tertiary base, e. g., tertiary amines such as trialkyl (e. g., trimethyl, triethyl, tripropyl, tributyl, etc.) amines, triaryl (e. g., triphenyl, tritolyl, etc.) amines, pyridine, dimethyl aniline, etc. The reaction between the hydrazino-substituted diazine and the acyl halide may be carried out in any suitable manner, but preferably is effected in the presence of a suitable solvent or mixture of solvents. It is advisable to use an anhydrous medium, e. g., ether, benzene, toluene, etc., because of the high degree of reactivity of the acyl halide. The reaction may be carried out under a variety of temperature and pressure conditions, for instance at normal, sub-normal or at elevated temperatures and at atmospheric, sub-atmospheric or super-atmospheric pressures.

The above reaction may be represented by the following general equation:

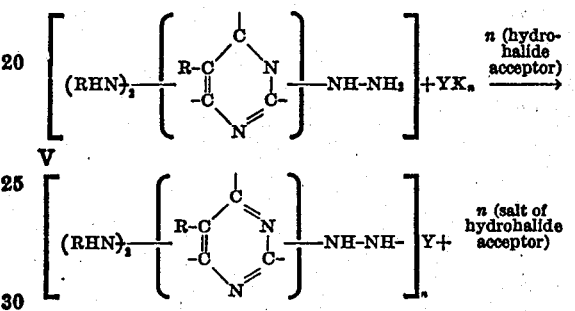

where X represents a halogen atom, and $n$, Y and R have the same meanings as given above with reference to Formula I, each halogen atom represented by X being linked directly to a carbon atom of a carbonyl group of the polyacyl radical represented by Y.

Another method that may be employed in preparing the new chemical compounds of this invention comprises effecting reaction between a monohalogeno diamino [(—NHR)$_2$] pyrimidine and a polyhydrazide of a polycarboxylic acid. This reaction preferably is carried out in the presence of a suitable solvent or mixture of solvents. A hydrohalide acceptor also preferably is present.

In order that those skilled in the art better may understand how the present invention may be carried into effect, the following examples are given by way of illustration and not by way of limitation. All parts are by weight.

*Example 1*

This example illustrates the preparation of bis-[2,6-di-(methylamino) pyrimidyl-4 hydrazinocarbonyl], which also may be named bis-[2,4-di-(methylamino) pyrimidyl-6 hydrazinocarbonyl].

| | Parts | Approx. mol ratio |
|---|---|---|
| 4-hydrazino 2,6-di-(methylamino) pyrimidine | 150 | 2 |
| Oxalyl chloride | 57 | 1 |
| Pyridine | 71 | 2 |

The oxalyl chloride was added slowly to the mixture of the other components while vigorously shaking the mixture. After the reaction had subsided, the mixture was shaken for 6 hours at room temperature and then was allowed to stand undisturbed for 64 hours at room temperature. A pasty mass containing bis-[2,6-di-(methylamino) pyrimidyl-4 hydrazinocarbonyl] was obtained. This mass was filtered to separate the solid, impure pyrimidine derivative from the liquid. The residue was washed well with water and dried. A yield of 158 parts of purified and dried product was obtained.

Example 2

This example illustrates the preparation of bis-[2,6-di-(methylamino) pyrimidyl-4 hydrazinocarbonyl] methane.

| | Parts | Approx. mol ratio |
|---|---|---|
| 4-hydrazino 2,6-di-(methylamino) pyrimidine | 150 | 2 |
| Malonyl chloride | 63 | 1 |
| Pyridine | 71 | 2 |

The same procedure was followed as described under Example 1. A yield of 164 parts of purified and dried bis-[2,6-di-(methylamino) pyrimidyl-4 hydrazinocarbonyl] methane was obtained.

Example 3

Bis-[4,6-di-(methylamino) pyrimidyl-2 hydrazinocarbonyl] is prepared in essentially the same manner as described under Example 1 with the exception that 150 parts of 2-hydrazino 4,6-di-(methylamino) pyrimidine are used instead of 150 parts of 4-hydrazino 2,6-di-(methylamino) pyrimidine.

Example 4

Bis-[4,6-di-(methylamino) pyrimidyl-2 hydrazinocarbonyl] methane is prepared in essentially the same manner as described under Example 2 with the exception that 150 parts of 2-hydrazino 4,6-di-(methylamino) pyrimidine are used instead of 150 parts of 4-hydrazino 2,6-di-(methylamino) pyrimidine.

Example 5

Bis-(2,6-diamino pyrimidyl-4 hydrazinocarbonyl) is prepared in essentially the same manner as described under Example 1 with the exception that 125 parts of 4-hydrazino 2,6-diamino pyrimidine are used in place of 150 parts of 4-hydrazino 2,6-di-(methylamino) pyrimidine.

Example 6

Bis-(4,6-diamino pyrimidyl-2 hydrazinocarbonyl) methane is prepared in essentially the same manner as described under Example 2 with the exception that 125 parts of 2-hydrazino 4,6-diamino pyrimidine are used instead of 150 parts of 4-hydrazino 2,6-di-(methylamino) pyrimidine.

Example 7

Alpha,beta,gamma-tri-[2,6- di -(methylamino) pyrimidyl-4 hydrazinocarbonyl] propane is prepared in essentially the same manner as described under Example 1 with the exception that 69 parts of tricarballylyl chloride are used instead of 57 parts of oxalyl chloride.

Example 8

A bis-(diamino pyrimidyl hydrazinocarbonyl) benzene, more particularly a bis-(4,6-diamino pyrimidyl-2 hydrazinocarbonyl) benzene or a bis-(2,6-diamino pyrimidyl-4 hydrazinocarbonyl) benzene, is prepared in essentially the same manner as described under Example 1 with the exception that 125 parts of 2-hydrazino 4,6-diamino pyrimidine or of 4-hydrazino 2,6-diamino pyrimidine are used in place of 150 parts of 4-hydrazino 2,6-di-(methylamino) pyrimidine and 91.2 parts of a phthalyl chloride (ortho-phthalyl dichloride, iso-phthalyl dichloride or terephthalyl dichloride) are used in place of 57 parts of oxalyl chloride.

Example 9

A bis-(diamino pyrimidyl hydrazinocarbonyl) ethane, more particularly an alpha,beta-bis-(4,6-diamino pyrimidyl-2 hydrazinocarbonyl) ethane or an alpha,beta-bis-(2,6-diamino pyrimidyl-4 hydrazinocarbonyl) ethane, is prepared in essentially the same manner as described under Example 1 with the exception that 125 parts of 2-hydrazino 4,6-diamino pyrimidine or of 4-hydrazino 2,6-diamino pyrimidine are used instead of 150 parts of 4-hydrazino 2,6-di-(methylamino) pyrimidine and 69.6 parts of succinyl chloride are used in place of 57 parts of oxalyl chloride.

Illustrative examples of other chemical compounds embraced by Formula I that may be produced in accordance with the present invention are listed below, including both poly-(diamino pyrimidyl hydrazinocarbonyl)-substituted aliphatic hydrocarbons, more particularly bis-(diamino pyrimidyl hydrazinocarbonyl) alkanes and alkenes, and poly-(diamino pyrimidyl hydrazinocarbonyl)-substituted aromatic hydrocarbons.

Bis-(4,6-diamino 5-methyl pyrimidyl-2 hydrazinocarbonyl)
Bis-(2,6-diamino pyrimidyl-4 hydrazinocarbonyl) methane
Bis-(4,6-diamino 5-phenyl pyrimidyl-2 hydrazinocarbonyl) methane
Alpha,beta-bis-[4,6-di-(methylamino) pyrimidyl-2 hydrazinocarbonyl] ethane
Alpha,beta-bis-[4,6-di-(ethylamino) pyrimidyl-2 hydrazinocarbonyl] ethane
Alpha,beta-bis-[4,6-di-(propenylamino) pyrimidyl-2 hydrazinocarbonyl] ethane
Alpha,beta-bis-[4,6-di-(cyclohexylamino) pyrimidyl-2 hydrazinocarbonyl] ethane
Alpha,beta-bis-(2,6-dianilino pyrimidyl-4 hydrazinocarbonyl) ethane
Bis-(4,6-diamino pyrimidyl-2 hydrazinocarbonyl) bromonaphthalenes
Alpha,beta-bis-[2,6-di-(fluoroanilino) pyrimidyl-4 hydrazinocarbonyl] ethane
Alpha,beta-bis-(2,6-ditoluido pyrimidyl-4 hydrazinocarbonyl) ethane
Alpha,beta-bis-(2,6-dixylidino pyrimidyl-4 hydrazinocarbonyl) ethane
Alpha,beta-bis-[2,6-di-(benzylamino) pyrimidyl-4 hydrazinocarbonyl] ethane.
Alpha,beta-bis-[2,6-di-(ethylanilino) pyrimidyl-4 hydrazinocarbonyl] ethane
Alpha,gamma-bis-(4,6-diamino pyrimidyl-2 hydrazinocarbonyl) propane
Alpha,omega-bis-(4,6-diamino 5-ethyl pyrimidyl-2 hydrazinocarbonyl) butane
Alpha,beta-bis-(4,6-diamino pyrimidyl-2 hydrazinocarbonyl) propene
Alpha,beta-bis-(4,6-diamino pyrimidyl-2 hydrazinocarbonyl) ethane
Alpha,beta-dis-(4-methylamino 6-amino pyrimidyl-2 hydrazinocarbonyl) ethane
Alpha,beta-bis-(4-anilino 6-amino pyrimidyl-2 hydrazinocarbonyl) ethane
Alpha,beta-bis-(4-anilino 6-methylamino pyrimidyl-2 hydrazinocarbonyl) ethane
Alpha,beta-bis-[2,6-di-(methylamino 5-tolyl pyrimidyl-4 hydrazinocarbonyl] ethane
Bis-[4,6-di-(methylamino) pyrimidyl-2 hydrazinocarbonyl] benzenes
Bis-(4,6-dianilino 5-phenyl pyrimidyl-2 hydrazinocarbonyl) benzenes
Bis-(4,6-diamino pyrimidyl-2 hydrazinocarbonyl) toluenes
Bis-(4,6-diamino pyrimidyl-2 hydrazinocarbonyl) xylenes Bis-(4,6-diamino pyrimidyl-2 hydrazinocarbonyl) naphthalenes
Bis-[4,6-di-(iodoanilino) pyrimidyl-2 hydrazinocarbonyl] benzenes
Alpha,beta-bis-[2,6-di-(ethylamino) 5-xenyl pyrimidyl-4 hydrazinocarbonyl] ethane
Bis-[4,6-di-(bromotoluido) pyrimidyl-2 hydrazinocarbonyl] methane
Alpha,omega-bis-[2-(cyclohexylamino) 5-chloroethyl 6-anilino pyrimidyl-4 hydrazinocarbonyl] phenylbutane
Alpha,beta,gamma-tri-(4,6-diamino pyrimidyl-2 hydrazinocarbonyl) propane
1,3,5-tri-(4',6'-diamino pyrimidyl-2' hydrazinocarbonyl) benzenes
Bis-(4,6-diamino pyrimidyl-2 hydrazinocarbonyl) chlorobenzenes
Bis-[2,6-di-(chloromethylamino) 5-ethyl pyrimidyl-4 hydrazinocarbonyl]
Bis-[4,6-di-(bromoanilino) pyrimidyl-2 hydrazinocarbonyl] methane
Bis-[2,6-di-(allylamino) 5-phenyl pyrimidyl-4 hydrazinocarbonyl] methane
Bis-[4,6-di-(cyclohexylamino) pyrimidyl-2 hydrazinocarbonyl] ethanes
Bis-[2,6-di-(octylamino) 5-cyclohexyl pyrimidyl-4 hydrazinocarbonyl] propanes
Bis-[4,6-di-(fluoroanilino) pyrimidyl-2 hydrazinocarbonyl] butanes
Bis-[2,6-di-(iodotoluido) 5-xenyl pyrimidyl-4 hydrazinocarbonyl] isopentanes
Bis-[4,6-di-(bromoanilino) pyrimidyl-2 hydrazinocarbonyl] heptanes
Bis-(2,6-diamino pyrimidyl-4 hydrazinocarbonyl) chloropropanes
Bis-[2,6-di-(chlorotoluido) pyrimidyl-4 hydrazinocarbonyl] benzenes
Bis-[4,6-di-(cyclohexenylamino) 5-allyl pyrimidyl-2 hydrazinocarbonyl] naphthalenes
Bis-[2,6-di-(pentylamino) pyrimidyl-4 hydrazinocarbonyl] chloronaphthalenes
Bis-[4,6-di-(xenylamino) 5-methyl pyrimidyl-2 hydrazinocarbonyl] xylenes
Bis-[2,6-di-(naphthylamino) pyrimidyl-4 hydrazinocarbonyl] ethylbenzenes
Bis-[4,6-di-(chloroethylamino) 5-tolyl pyrimidyl-2 hydrazinocarbonyl] toluenes
Bis-[2,6-di-(butylamino) 5-butyl pyrimidyl-4 hydrazinocarbonyl] propanes
Bis-[4,6-di-(bromopropylamino) 5-octyl pyrimidyl-2 hydrazinocarbonyl] butanes In a manner similar to that described above with particular reference to the production of poly-(pyrimidyl hydrazino), that is, poly-(1,3-diazinyl hydrazino), derivatives of polycarboxylic acids, corresponding derivatives of the 1,2-diazines (pyridazines) and of the 1,4-diazines (pyrazines) may be prepared.

What we claim as new and desire to secure by Letters Patent of the United States is:

1. Chemical compounds corresponding to the general formula

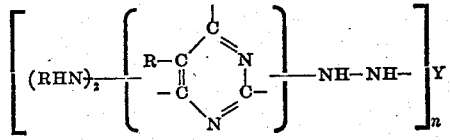

where R represents a member of the class consisting of hydrogen and monovalent hydrocarbon and halo-hydrocarbon radicals, Y represents a polyacyl radical of a polycarboxylic acid, and $n$ is an integer having a value equal to the valency of the polyacyl radical of Y, one nitrogen atom of the grouping —NH—NH— in the above formula being linked to a carbon atom of the diazine nucleus and the other nitrogen atom being linked to a carbon atom of a carbonyl grouping of the polyacyl radical represented by Y.

2. Chemical compounds corresponding to the general formula

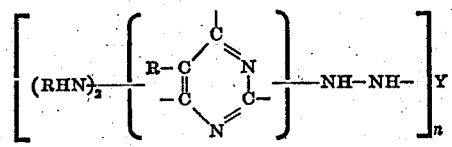

where R represents hydrogen, Y represents a polyacyl radical of a polycarboxylic acid, and $n$ is an integer having a value equal to the valency of the polyacyl radical of Y, one nitrogen atom of the grouping —NH—NH— in the above formula being linked to a carbon atom of the diazine nucleus and the other nitrogen atom being linked to a carbon atom of a carbonyl grouping of the polyacyl radical represented by Y.

3. Chemical compounds corresponding to the general formula

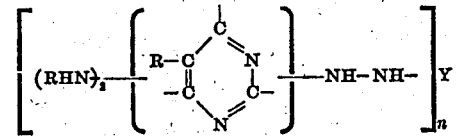

where R represents a member of the class consisting of hydrogen and monovalent hydrocarbon and halo-hydrocarbon radicals, Y represents a polyacyl radical of an aliphatic polycarboxylic acid, and $n$ is an integer having a value equal to the valency of the polyacyl radical of Y, one nitrogen atom of the grouping —NH—NH— in the above formula being linked to a carbon atom of the diazine nucleus and the other nitrogen atom being linked to a carbon atom of a carbonyl grouping of the polyacyl radical represented by Y.

4. Chemical compounds corresponding to the general formula

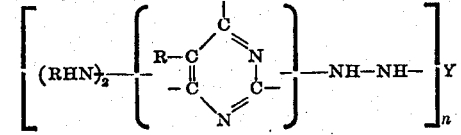

where R represents a member of the class consisting of hydrogen and monovalent hydrocarbon and halo-hydrocarbon radicals, Y represents a polyacyl radical of an aromatic polycarboxylic acid, and $n$ is an integer having a value equal to the valency of the polyacyl radical of Y, one nitrogen atom of the grouping —NH—NH— in the above formula being linked to a carbon atom of the diazine nucleus and the other nitrogen atom being linked to a carbon atom of a carbonyl grouping of the polyacyl radical represented by Y.

5. Chemical compounds corresponding to the general formula

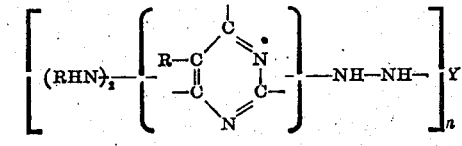

where R represents hydrogen, Y represents a polyacyl radical of an aliphatic polycarboxylic acid, and $n$ is an integer having a value equal to the valency of the polyacyl radical of Y, one nitrogen atom of the grouping —NH—NH— in the above formula being linked to a carbon atom of the diazine nucleus and the other nitrogen atom being linked to a carbon atom of a carbonyl grouping of the polyacyl radical represented by Y.

6. Chemical compounds corresponding to the general formula

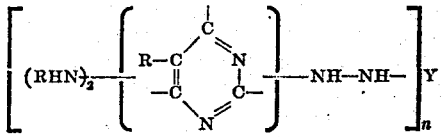

where R represents hydrogen, Y represents a polyacyl radical of an aromatic polycarboxylic acid, and $n$ is an integer having a value equal to the valency of the polyacyl radical of Y, one nitrogen atom of the grouping —NH—NH— in the above formula being linked to a carbon atom of the diazine nucleus and the other nitrogen atom being linked to a carbon atom of a carbonyl grouping of the polyacyl radical represented by Y.

7. A poly-(diamino pyrimidyl hydrazinocarbonyl)-substituted aliphatic hydrocarbon.

8. A bis-(diamino pyrimidyl hydrazinocarbonyl) alkane.

9. A poly-(diamino pyrimidyl hydrazinocarbonyl)-substituted aromatic hydrocarbon.

10. A bis-(diamino pyrimidyl hydrazinocarbonyl) benzene.

11. A bis-(diamino pyrimidyl hydrazinocarbonyl) ethane.

12. Alpha,beta-bis-(2,6-diamino pyrimidyl-4 hydrazinocarbonyl) ethane.

13. A bis-[di-(methylamino) pyrimidyl hydrazinocarbonyl].

14. Bis-[2,6-di-(methylamino) pyrimidyl-4 hydrazinocarbonyl].

15. The method of preparing chemical compounds corresponding to the general formula

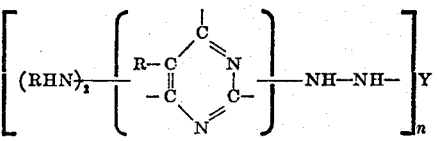

where R represents a member of the class consisting of hydrogen and monovalent hydrocarbon and halo-hydrocarbon radicals, Y represents a polyacyl radical of a polycarboxylic acid, and $n$ is an integer having a value equal to the valency of the polyacyl radical of Y, —NH—NH— in the above formula being linked to a carbon atom of the diazine nucleus and the other nitrogen atom being linked to a carbon atom of a carbonyl grouping of the polyacyl radical represented by Y, said method comprising effecting reaction, in the presence of a hydrohalide acceptor, between a compound corresponding to the general formula

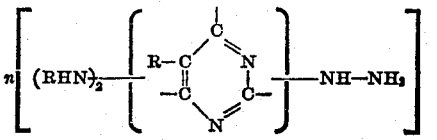

and an acyl halide corresponding to the general formula

where X represents a halogen atom, and $n$, Y and R have the same meanings as given above, each halogen atom represented by X being linked directly to a carbon atom of a carbonyl group of the polyacyl radical represented by Y.

16. The method of preparing chemical compounds corresponding to the general formula

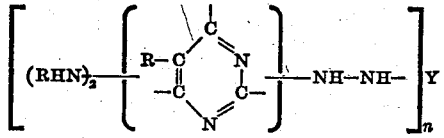

where R represents hydrogen, Y represents a polyacyl radical of a polycarboxylic acid, and $n$ is an integer having a value equal to the valency of the polyacyl radical of Y, one nitrogen atom of the grouping —NH—NH— in the above formula being linked to a carbon atom of the diazine nucleus and the other nitrogen atom being linked to a carbon atom of a carbonyl grouping of the polyacyl radical represented by Y, said method comprising effecting reaction, in the presence of a tertiary base, between a compound corresponding to the general formula

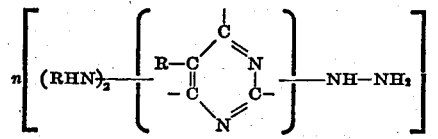

and an acyl halide corresponding to the general formula

where X represents a chlorine atom, and $n$, Y and R have the same meanings as given above, each chlorine atom represented by X being linked directly to a carbon atom of a carbonyl group of the polyacyl radical represented by Y.

17. The method of preparing a bis-[di-(methylamino) pyrimidyl hydrazinocarbonyl] which comprises effecting reaction, in the presence of a hydrohalide acceptor, between oxalyl chloride and a hydrazino di-(methylamino) pyrimidine in the ratio of one mol of the former to approximately two mols of the latter.

18. The method of preparing bis-[2,6-di-(methylamino) pyrimidyl-4 hydrazinocarbonyl] which comprises effecting reaction, in an anhydrous liquid medium comprising pyridine, between oxalyl chloride and 4-hydrazino 2,6-di-(methylamino) pyrimidine in the ratio of one mol of the former to approximately two mols of the latter.

GAETANO F. D'ALELIO.
JAMES W. UNDERWOOD.

Certificate of Correction

Patent No. 2,339,060. January 11, 1944.

GAETANO F. D'ALELIO ET AL.

It is hereby certified that errors appear in the printed specification of the above numbered patent requiring correction as follows: Page 1, second column, line 1, for "meaninngs" read *meanings*; line 31, for "can" read *may*; line 61, strike out "2-hydrazino 4,6-di-(methylamino) pyrimidine"; page 2, second column, lines 18 to 23 inclusive, for that portion of the formula reading:

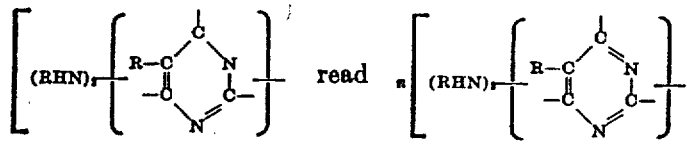

Page 3, second column, line 59, for "ethane" read *ethene*; line 60, for "beta-dis" read *beta-bis*; line 66, after "methylamino" insert a closing parenthesis; page 5, first column, line 53, after "Y," insert *one nitrogen atom of the grouping*; and that the said Letters Patent should be read with these corrections therein that the same may conform to the record of the case in the Patent Office.

Signed and sealed this 18th day of April, A. D. 1944.

[SEAL]

LESLIE FRAZER,
*Acting Commissioner of Patents.*